March 26, 1974  G. E. SCHEITLIN ET AL  3,799,748
CATALYTIC CONVERTER
Filed Dec. 1, 1972  3 Sheets-Sheet 3

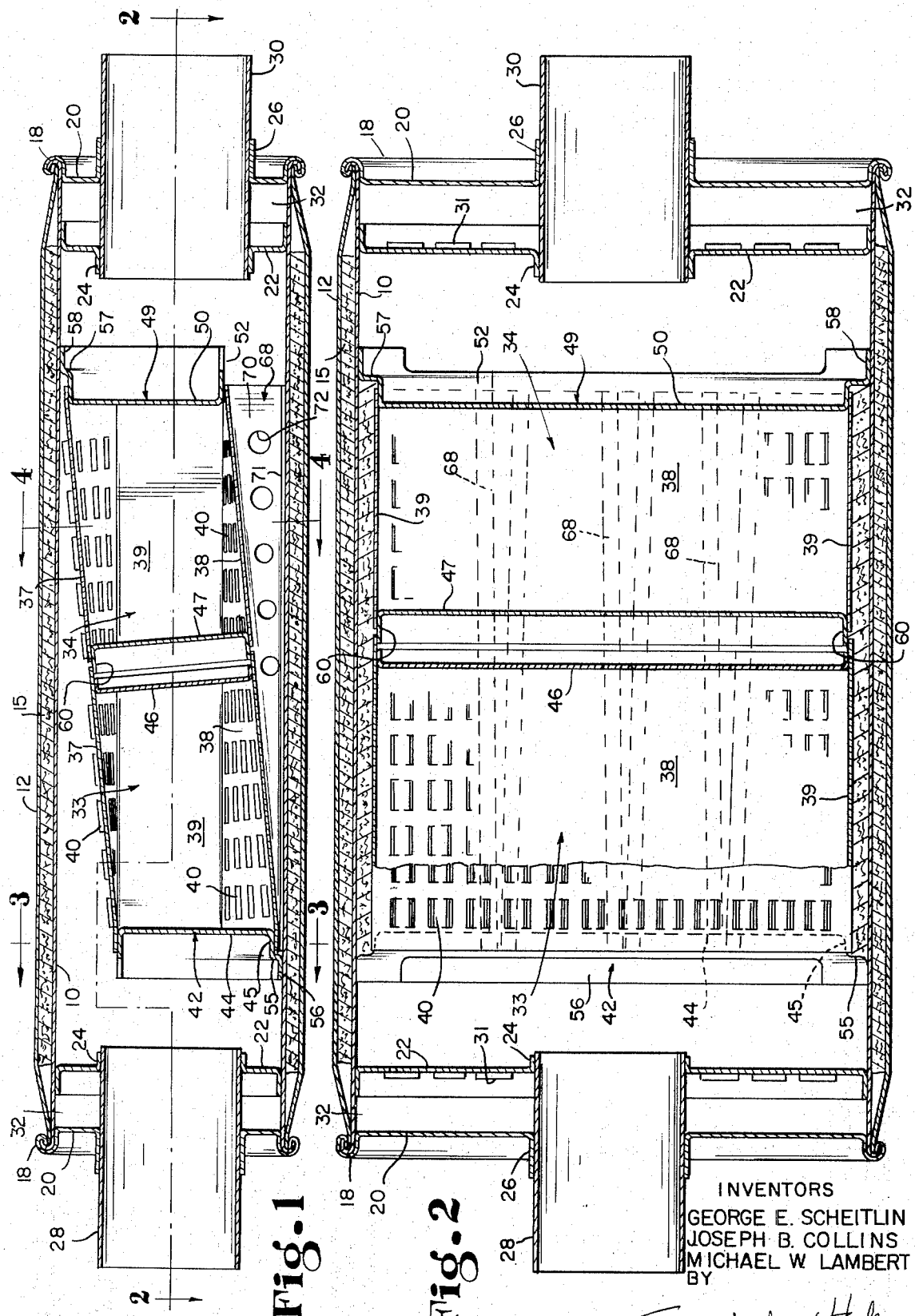

United States Patent Office 3,799,748
Patented Mar. 26, 1974

3,799,748
CATALYTIC CONVERTER
George E. Scheitlin and Joseph B. Collins, Columbus, Ind., and Michael W. Lambert, St. Louis, Mo., assignors to Arvin Industries, Inc., Columbus, Ind.
Continuation-in-part of abandoned application Ser. No. 141,624, May 10, 1971. This application Dec. 1, 1972, Ser. No. 311,237
Int. Cl. F01n 3/14; B01j 9/04
U.S. Cl. 23—288 F     4 Claims

ABSTRACT OF THE DISCLOSURE

A catalytic converter for removing noxious pollutants from an exhaust gas stream having a pair of conversion chambers mounted therein between its inlet and outlet. The conversion chambers are slidably interconnected at their adjacent ends and are rigidly connected to the converter at their opposed ends whereby they are free to expand and contract in response to temperature changes.

---

This is a continuation-in-part application of our copending application Ser. No. 141,624, filed May 10, 1971, now abandoned.

BACKGROUND OF THE INVENTION

Catalytic converters for removing noxious pollutants from an automobile exhaust gas stream are known in the art. Such converters have employed tilted conversion chambers as shown in U.S. Pat. No. 3,149,925, and they have been employed in line chambers which are mounted within the outer converter shell in a manner to permit them to expand and contract as shown in U.S. Pat. Nos. 2,853,367, and 2,828,189.

This invention provides an improved catalytic converter structure having a pair of tilted conversion chambers which are mounted in the converter to permit their expansion and contraction without warping and which ensure a maximum exposure of the exhaust gases moving through the converter to the catalytic material in the chambers.

SUMMARY OF THE INVENTION

In accordance with one form of the invention, there is provided an elongated outer shell closed at its ends by a pair of end caps. An inlet conduit projects through one of said end caps and an outlet conduit projects through the other of said end caps with said inlet and outlet conduits being in open communication with the interior of the converter.

A pair of conversion chambers adapted to hold catalytic material are mounted in the shell between the inlet and outlet conduits. Said chambers, which are provided with a pair of opposed perforated walls for the passage of exhaust gases therethrough, are rigidly connected to the outer shell at their opposed ends. The adjacent ends of said chambers are slidably interconnected to permit said chambers to expand and contract with respect to each other and with respect to the outer shell.

DESCRIPTION OF THE DRAWINGS

The accompanying drawings illustrate the invention. In such drawings:

FIG. 1 is a longitudinal vertical section taken on the medial axis of a catalytic converter embodying the invention;

FIG. 2 is a horizontal section taken on the line 2—2 of FIG. 1;

DETAILED DESCRIPTION OF THE PREFERRED EMBODIMENT

Figure 3:
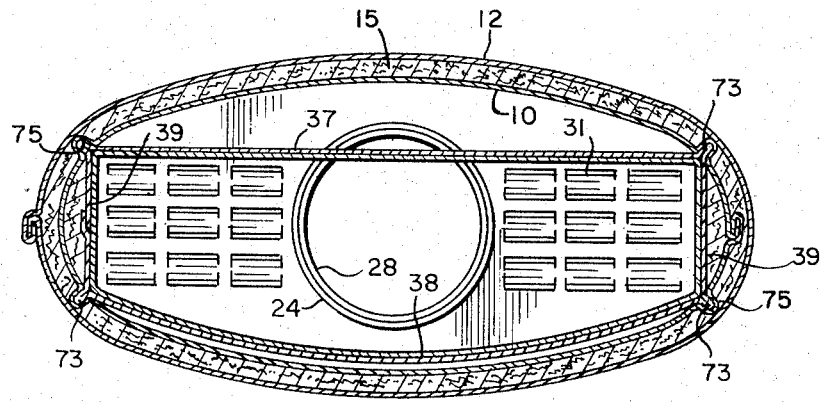
FIG. 3 is a transverse section taken on the line 3—3 of FIG. 1.
Figure 4:
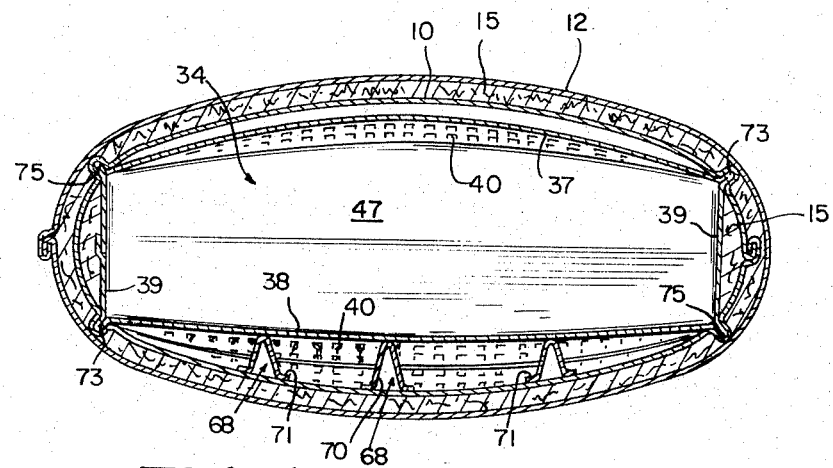
FIG. 4 is a transverse section taken on the line 4—4 of FIG. 1.

As illustrated in the drawings, the converter is housed in an elongated shell construction having inner and outer side walls 10 and 12 disposed in spaced relationship with a layer of thermal insulation 15 interposed therebetween. The side walls 10 and 12, for strength and economy of space, are in the form of concentric closed curves, an ellipse as shown. The ends of the shell side walls 10 and 12 abut each other and are rigidly connected, as by common roll seams 18, to a pair of end caps 20 closing the opposed ends of the shell.

A pair of baffle plates 22 are mounted within the shell slightly inwardly from the end caps 20. Each of said baffle plates is provided with a shouldered aperture 24 disposed in axial alignment with a shouldered aperture 26 formed in each of the end caps 20. The aligned openings 24 and 26 support an inlet conduit 28 at one end of the converter, and the aligned openings 24 and 26 at the opposite end of the converter support an outlet conduit 30. Each of the baffle plates 22 is provided with a plurality of louvered openings 31. The inlet and outlet conduits 28 and 30 terminate inwardly of the baffle plates 22 whereby the spaces between said baffle plates and their adjacent end caps 20 form a pair of sound attenuating chambers 32 at the opposite ends of the converter; said chambers being acoustically coupled to the gas stream through the baffle plate openings 31.

A pair of conversion chambers 33 and 34 are mounted within the converter in spaced relation to the baffle plates 22. The chambers are adapted to hold catalytic material for removing noxious pollutants from the exhaust gas stream as it passes from the converter inlet conduit 28 to the outlet conduit 30.

As shown, the chambers 33 and 34 are substantially identical in construction. Each of said chambers has an elongated top wall 37 and a bottom wall 38 interconnected by a pair of imperforate side walls 39. Said top and bottom walls are each provided with longitudinally extending rows of slots or louvered openings 40 to permit gas flow through the chambers. The forward end of the chamber 33, the end adjacent inlet 28, is closed by an end plate 42 comprising an imperforate end wall 44 extending across the chamber and integral with a forwardly directed flange 45 angularly offset with respect to the longitudinal axis of the chamber. The opposite end of chamber 33 is closed by an imperforate end cap 46 connected to the top, bottom and side walls of chamber 33 inwardly from the ends thereof. The rearward end of chamber 34, the end adjacent the outlet 30, is closed by an end cap 49 comprising an imperforate end wall 50 extending across the chamber and integral with a rearwardly directed peripheral flange 52 angularly offset with respect to the longitudinal axis of the chamber. The end of chamber 34 adjacent the chamber 33 is closed by an imperforate end cap 47 connected to the top, bottom, and side walls of chamber 34.

The chambers 33 and 34 extend diagonally across the converter, and are rigidly connected to the inner side wall 10 of the outer shell by their end caps 42 and 49. To this end, flange 45, at the sides and bottom of chambers 33, projects beyond the forward edge of said chamber and is bent laterally outwardly and forwardly as at 55, at the sides of the chamber and downwardly and forwardly, as at 56, at the bottom of said chamber. The outwardly and forwardly bent flange stretches 55 and 56 are curved to abut the adjacent portions of the shell side wall 10 and are fixedly connected thereto. The flange 52 at the sides and top of chamber 34 projects beyond the rearward edge of said chamber and is bent laterally outwardly and rearwardly, as at 57, at the sides of the chamber and upwardly and rearwardly, as at 58, at the top of the chamber. Like the flange stretches 55 and 56, the flange stretches 57 and 58 are curved to abut the adjacent portions of the shell side wall 10 and are fixedly connected thereto. Thus, as shown in FIG. 2, the stretches 55–58 prevent gas flow along the sides of the chambers 33 and 34.

The chambers 33 and 34 are slidably interconnected at their adjacent ends to permit said chambers to expand and contract with respect to each other and with respect to the outer shell in response to temperature changes within the converter. To this end, the forward edge of the end cap 47 projects forwardly of the top, bottom, and side walls 37–39 as at 60, and the rearward ends of the top, bottom, and side walls 37–39 of chamber 33 are slidably received over the said forwardly projecting portion 60. Thus, the top, bottom and side walls of chamber 34 form continuations of the corresponding walls of chamber 33 while still permitting the two chambers to expand and contract with respect to each other.

Desirably, the continuous top and bottom walls 37 and 38 of the chambers 33 and 34 have opposed congruent configurations. The top wall edge of chamber 34 adjacent the outlet 30 has an arcuate cross-section corresponding to the curvature of the top portion of the shell side wall 10, which arcuate cross-section progressively flattens out toward the end of the chamber 33 adjacent the inlet 28 into coplanarity. Conversely, the bottom wall edge of chamber 33 adjacent inlet 28 has an arcuate cross-section which progressively flattens out toward the end of the chamber 34 adjacent outlet 30 into coplanarity. With the chamber extending diagonally across the converter, this opposed configuration of their continuous top and bottom walls provides an inlet and outlet for said chambers which ensures a uniform distribution of the gas flow through the chambers for maximum removal of the pollutants in the gas stream.

As is illustrated in the drawings, the chambers 33 and 34 are slidably supported on a plurality of longitudinally extending, laterally spaced, wedge-shaped braces 68 interposed between the bottom walls 38 of the chambers 33 and 34 and the lower portion of the shell side wall 10. Each of said braces comprises a pair of V-shaped walls 70 having their apex in sliding engagement with the chamber bottom walls 38 between a pair of adjacent rows of louvered openings 40. The lower ends of the walls 70 terminate in laterally projecting fingers 71 rigidly secured to the shell side wall 10. Because of the tilted mounting of the chambers, the brace walls 70 gradually increase in depth from their ends adjacent the inlet 28 to their ends disposed adjacent the outlet 30. Conveniently, pluralities of openings 72 are formed in the brace walls 70 to help uniformly distribute the gas flow out of the chambers.

As shown in FIG. 3, the converter is rigidized and the chambers 33 and 34 are further supported within it for expansion and contraction movements by forming the metal at the edges of the chamber side walls 39 and top and bottom walls 37 and 38 into beads 73 projecting obliquely outwardly from the chambers. Said beads are slidably received in inwardly open grooves 75 formed in the shell side wall and extending substantially the length thereof. If desired, however, the beads and grooves 73 and 75 can be omitted and the chamber side walls 39 curved to slidably abut the adjacent portion of the shell side wall 10.

Figure 5:
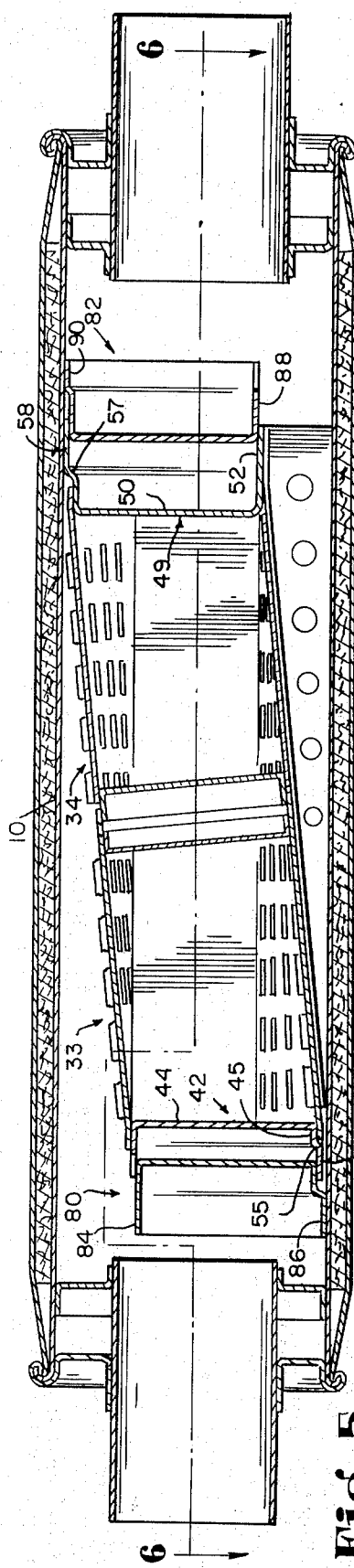
FIG. 5 is a fragmentary longitudinal vertical section similar to FIG. 1 but showing a modified embodiment of mounting the conversion chambers.
Figure 6:
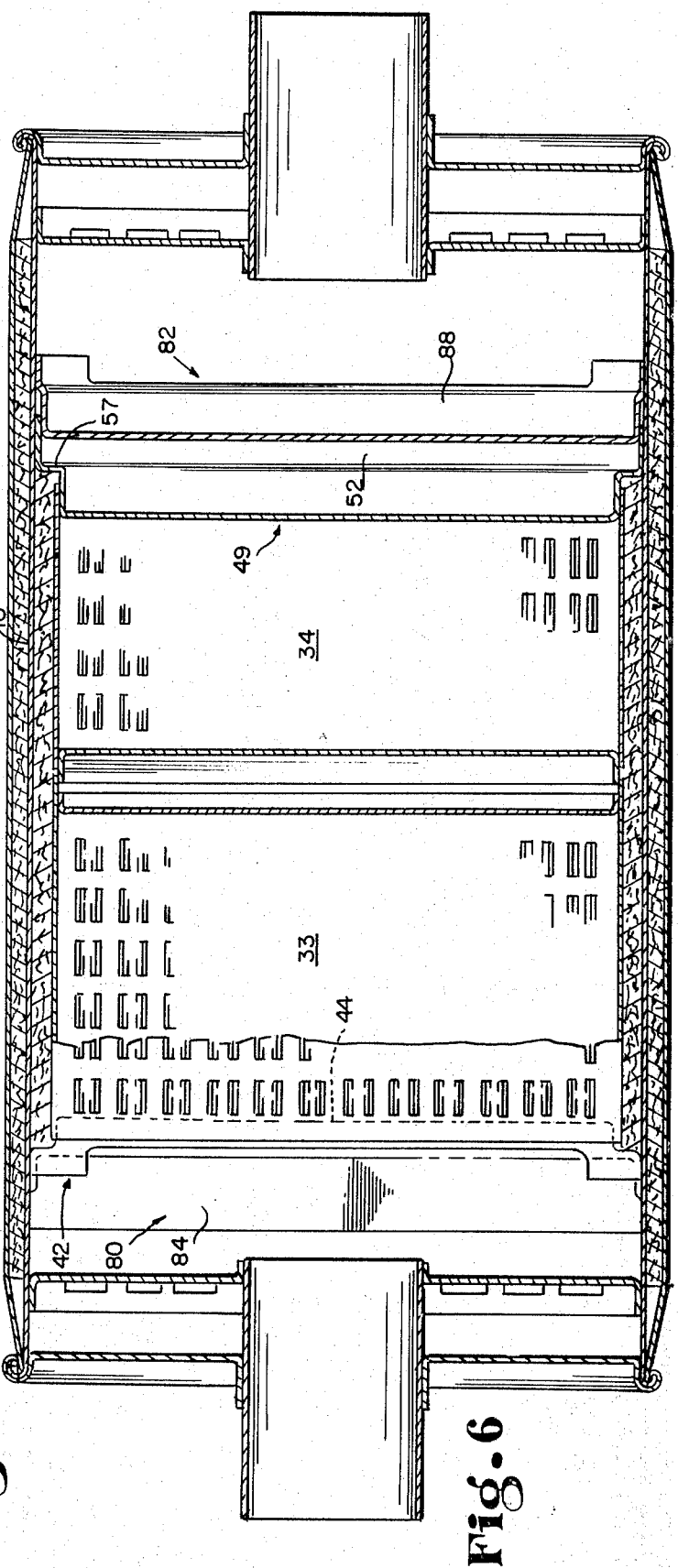
FIG. 6 is a horizontal section taken on the line 6—6 of FIG. 5.

The embodiment shown in FIGS. 5 and 6 differs from that shown in FIGS. 1–4 solely in the interconnection of chambers 33 and 34 to the inner shell 10. In FIGS. 1–4 the chamber end caps 42 and 49 are fixedly connected directly to the shell 10, whereas in the embodiment shown in FIGS. 5 and 6 they are slidably interconnected to said shell by a pair of brackets 80 and 82. Thus, in the embodiment shown in FIGS. 5 and 6, said chambers are longitudinally movable with respect to each other both at their adjacent and their opposed ends.

As shown in FIGS. 5 and 6, the bracket 80 has a forwardly projecting peripheral flange 84. Said flange is spaced slightly inwardly from the adjacent portion of the shell wall 10, but along its bottom and side stretches, it has an outwardly offset collar 86 fixedly connected to the side wall 10. The laterally offset side stretches 55 and downwardly offset bottom stretch 56 of the end plate flange 45 are slidably received on the side and bottom stretches, respectively, of the bracket flange 84, and the top stretch of the flange 45 is slidably received on the top stretch of flange 84. In this manner, the chamber 33 is slidably interconnected to the shell 10 at its forward end and slidably interconnected to chamber 34 at its rearward end.

The bracket 82 slidably interconnects the rearward end of chamber 34 to the shell in the same manner as the bracket 80 slidably interconnects the forward end of chamber 33 to said shell. Thus, bracket 82 has a rearwardly projecting peripheral flange 88 which is spaced slightly inwardly from the shell side wall 10. The rearward portion of flange 88 comprises an outwardly offset collar 90 fixedly connected to the side wall 10. The laterally offset side stretches 57 and upwardly offset top stretch 58 of the end plate flange 52 are slidably received on the side and bottom stretches, respectively, of the bracket flange 88 and the bottom stretch of flange 52 is slidably received against the bottom stretch of flange 88. In this manner, the chamber 34 is slidably interconnected to the shell 10 at its rearward end and slidably interconnected to the chamber 33 at its forward end.

It is to be understood, of course, that the embodiments of FIGS. 1 and 5 can be combined so that in addition to being slidably interconnected at their adjacent ends, either or both of the chambers 33 and 34 can have its end remote from the other slidably or fixedly interconnected to the shell.

We claim:

1. In a catalytic converter for removing noxious pollutants from an exhaust gas stream, an enclosed elongated shell, gas inlet and outlet conduits in open communication with the interior of said shell adjacent its opposed ends, and a pair of conversion chambers mounted in said shell and adapted to hold catalytic material for removing noxious pollutants from said exhaust gases, each of said chambers having perforated top and bottom walls for the passage of gas through said chambers from the inlet conduit to the outlet conduit and interconnected by a pair of imperforate side walls and end caps, one of the end caps on one of said chambers projecting outwardly therefrom and the adjacent ends of the top, bottom and side walls on the other chamber are slidably received thereon, the end caps at the opposed ends of said chamber interconnecting the opposed ends of said chambers to said shell.

2. In a catalytic converter for removing noxious pollutants from an exhaust gas stream, an enclosed elongated shell, gas inlet and outlet conduits in open communication with the interior of said shell adjacent its opposed ends, a pair of conversion chambers mounted in said shell and adapted to hold catalytic material for removing noxious pollutants from said exhaust gases, means slidably interconnecting the adjacent ends of said chambers and means rigidly connecting the opposed ends of said chambers to said shell, each of said chambers having a pair of perforated walls for the passage of gas through said chambers from the inlet conduit to the outlet conduit, and a plurality of laterally spaced braces mounted in said shell and slidably supporting said chambers.

3. In a catalytic converter for removing noxious pollutants from an exhaust gas stream, an enclosed elongated shell, gas inlet and outlet conduits in open communication with the interior of said shell adjacent its opposed ends and a pair of conversion chambers mounted in said shell and adapted to hold catalytic material for removing noxious pollutants from said exhaust gases, said chambers extending diametrically across said shell and each comprising perforated top and bottom walls interconnected by pairs of imperforate side walls and end caps, one of the end caps on one of said chambers projecting outwardly therefrom and the adjacent ends of the top, bottom and side walls on the other chamber being slidably received thereon, the end caps at the opposed ends of said chambers having outwardly projecting peripheral flanges angularly offset with respect to the longitudinal axis of said chambers, said flanges projecting laterally from the sides of said chambers, downwardly at the bottom of one of said chambers, and upwardly at the top of the other of said chambers, said laterally, downwardly and upwardly projecting flanges being rigidly connected to said shell.

4. In a catalytic converter for removing noxious pollutants from an exhaust gas stream, an enclosed elongated shell, gas inlet and outlet conduits in open communication with the interior of said shell adjacent its opposed ends, a pair of conversion chambers mounted in said shell and adapted to hold catalytic material for removing noxious pollutants from said exhaust gases, each of said chambers having perforated top and bottom walls interconnected by a pair of imperforate side walls and end caps, one of the end caps on one of said chambers projecting outwardly therefrom and the adjacent ends of the top, bottom and side walls on the other chamber are slidably received thereon, and a pair of brackets at the opposed end of said chambers, each of said brackets having a flange spaced from said shell, an outwardly offset collar on each of said flanges rigidly connected to said shell, the end caps at the opposed ends of said chambers being slidably supported on the flanges on said brackets.

References Cited
UNITED STATES PATENTS

| | | | |
|---|---|---|---|
| 2,776,875 | 1/1957 | Houdry | 23—288 F UX |
| 2,834,657 | 5/1958 | Houdry | 23—288 F UX |
| 2,853,367 | 9/1958 | Karol et al. | 23—288 F |
| 3,016,108 | 1/1962 | Myddelton | 23—288 F UX |
| 3,024,593 | 3/1962 | Houdry | 23—288 F UX |
| 3,083,083 | 3/1963 | Boysen | 23—288 F |
| 3,086,839 | 4/1963 | Bloch | 23—288 F X |
| 3,090,677 | 5/1963 | Scheitlin et al. | 23—288 F |
| 3,149,925 | 9/1964 | Scheitlin | 23—288 F |
| 3,166,382 | 1/1965 | Purse et al. | 23—288 F |
| 3,180,712 | 4/1965 | Hamblin | 23—288 F |
| 3,223,491 | 12/1965 | Maillie et al. | 23—288 F |
| 3,434,806 | 3/1969 | DeRycke et al. | 23—288 F |

BARRY S. RICHMAN, Primary Examiner

U.S. Cl. X.R.

60—299